C. G. KOPPITZ.
PROCESS OF AND APPARATUS FOR INTERCONVERTING AND ADJUSTING THE RELATIVE VOLTAGE OF HIGH POTENTIAL ALTERNATING AND DIRECT ELECTRIC CURRENTS.
APPLICATION FILED JAN. 21, 1913.
1,244,614.
Patented Oct. 30, 1917.
2 SHEETS—SHEET 1.
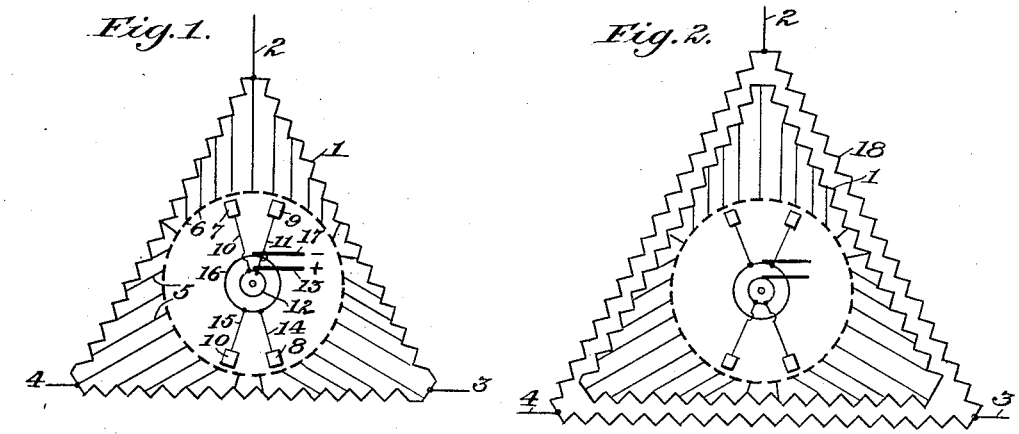
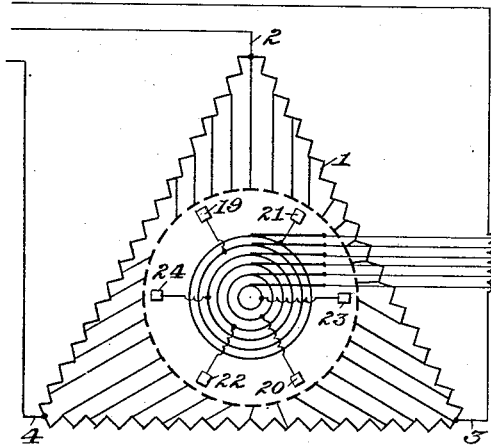
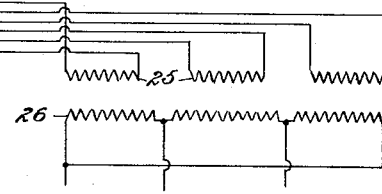
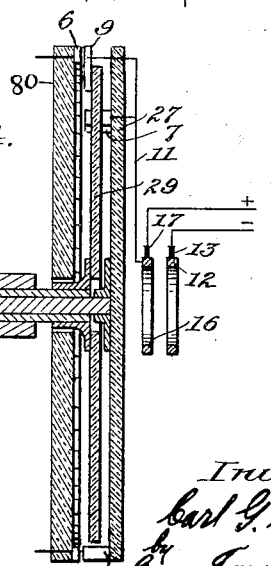

C. G. KOPPITZ.
PROCESS OF AND APPARATUS FOR INTERCONVERTING AND ADJUSTING THE RELATIVE VOLTAGE
OF HIGH POTENTIAL ALTERNATING AND DIRECT ELECTRIC CURRENTS.
APPLICATION FILED JAN. 21, 1913.
1,244,614.
Patented Oct. 30, 1917.
2 SHEETS—SHEET 2.
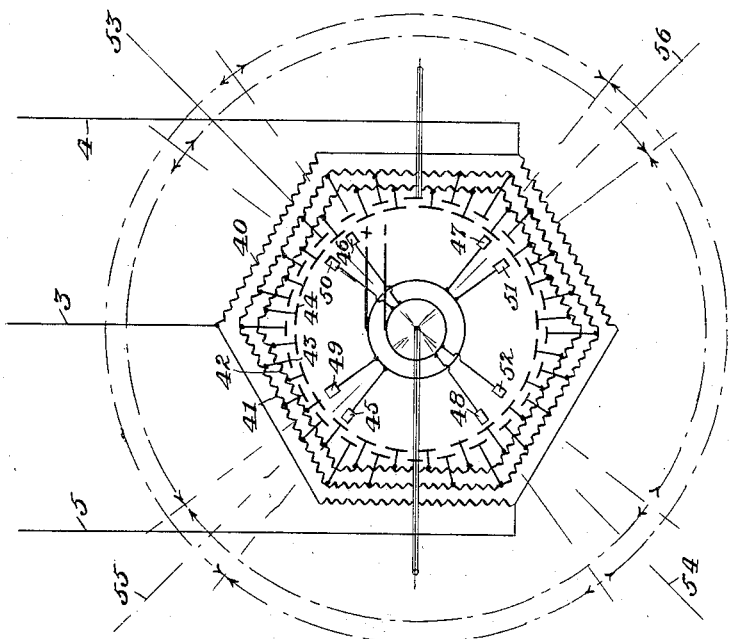
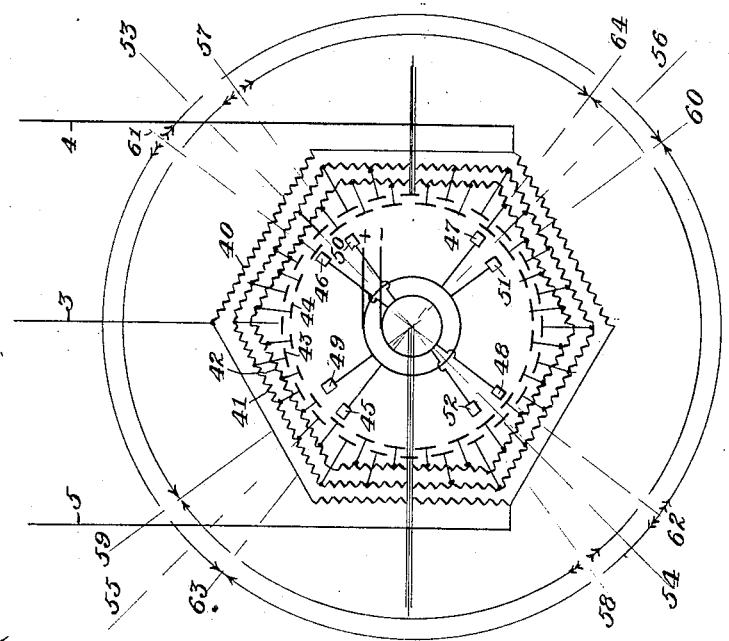

UNITED STATES PATENT OFFICE.

CARL G. KOPPITZ, OF YOUNGSTOWN, OHIO.

PROCESS OF AND APPARATUS FOR INTERCONVERTING AND ADJUSTING THE RELATIVE VOLTAGE OF HIGH-POTENTIAL ALTERNATING AND DIRECT ELECTRIC CURRENTS.

1,244,614.    Specification of Letters Patent.    Patented Oct. 30, 1917.

Application filed January 21, 1913. Serial No. 743,399.

*To all whom it may concern:*

Be it known that I, CARL G. KOPPITZ, a citizen of the United States, residing at Youngstown, in the county of Mahoning and State of Ohio, have invented certain new and useful Improvements in Processes of and Apparatus for Interconverting and Adjusting the Relative Voltage of High-Potential Alternating and Direct Electric Currents, of which the following is a specification.

In my applications Ser. No. 646,988, filed August 31, 1911, now Patent No. 1,183,881 of date May 23, 1916, and Ser. No. 724,963, filed October 10, 1912, I have described and claimed a process of and apparatus for interconverting polyphase and direct electric currents having a potential of from ten up to several hundred thousand volts, by causing the polyphase currents to traverse a closed winding and transferring unidirectional currents as arcs between segments connected to successive portions of said windings and brushes revolving in synchronism with the polyphase current. Said applications also contemplate the variation of the potential of the direct current delivered, by shifting the angular position of the brushes relative to the phases or waves of current in the windings.

The present invention utilizes the broad principles set forth in said prior applications, but involves the provision of two pairs of brushes of opposite polarity, which are rotated in unison but are relatively adjustable to vary the angular distance between the brushes of like polarity.

Referring to the accompanying drawing—

Figure 1 is a diagrammatic view of the electrical features of a three-phase auto-converter having a single delta-connected closed winding and two pairs of brushes;

Fig. 2 is a diagrammatic view of a similar converter having separate primary and secondary windings;

Fig. 3 is a diagrammatic view of a converter having a single winding and six brushes, in two sets;

Fig. 4 is a section of the current-collector and means for rotating and adjusting the two pairs of brushes on a plane through one pair of brushes; and Figs. 5 and 6 are diagrammatic views of three-phase converters having a primary winding, two secondary windings, and four pairs of brushes.

The auto-converter shown in Fig. 1 comprises a winding 1 having three-phase terminals 2, 3, 4. Spaced equidistant leads 5 extend inward from the winding to a circular series of collector-segments 6. Two pairs of brushes of opposite polarity 7, 8 and 9, 10, in arcing proximity to the segments, are carried by separate concentric revolving members, for example a shaft and a sleeve surrounding the shaft. The brushes 7, 9 of one polarity are electrically connected by leads 10, 11 to a slip-ring 12 on which bears a fixed brush 13. The brushes 8, 10, respectively diametrically opposite to brushes 7, 9, are electrically connected by leads 14, 15 to a slip-ring 16 on which bears a fixed brush 17. When the concentric members carrying the brushes are adjusted to bring the two pairs of brushes into alinement, and when the brushes are rotated in synchronism with the cycles of current, thereby maintaining predetermined positions on the traveling E. M. F. wave in the winding 1, and in apposition to the successive segments connected to those portions of the winding in which the potential wave is successively at its maximum, direct current of the highest available potential will be transmitted as arcs from the segments to the revolving brushes, and thence to the fixed brush-terminals 13, 17. By simultaneously shifting the two pairs of brushes uniform distances in opposite directions away from a diametral line coincident with the peak of the potential-wave, direct currents of correspondingly decreased potential are simultaneously collected by the two pairs of brushes, arcing from the segments thereto, and may be taken off by the brushes 13, 17, since there is a uniform difference in voltage between the successive commutator segments on each side of the peak of the potential-wave.

The converter illustrated in Fig. 2 is identical with that shown in Fig. 1, except that it is provided with a separate primary winding 18, receiving current from the three-phase leads 2, 3, 4 and inducing current in the winding 1 which is connected to the segments. Impressed currents of moderate voltage may thereby be stepped up to higher voltage, sufficient to cause them to arc across from the segments to the brushes.

Fig. 3 illustrates a converter which is identical with that shown in Fig. 1, except that it is provided with six brushes, in two sets, one set consisting of the three brushes 19, 22, 23 and the other set of the three brushes 20, 21, 24, 120 degrees apart, the brushes being separately carried and electrically insulated from each other by concentric revolving members. The brushes of the two sets are not necessarily diametrically opposite, assuming this position, as illustrated, only at half-voltage. Each brush is connected to a separate slip-ring on which bears a fixed brush-terminal. These brush-terminals are connected in pairs to the ends of three separate primary windings 25, which induce three-phase current for consumption in a closed winding 26. By driving the revolving brushes at a uniform speed asynchronous with the rotation of the currents in the winding 1, three-phase currents of any desired frequency may be collected by the revolving brushes. The relative positions of the two sets of brushes with respect to each other determines the voltage.

Fig. 4 illustrates a specific means for adjusting the two pairs of brushes shown in Figs. 1 and 2. An insulating disk 80 carries the commutator segments 6. The brush 7 (not shown) and brush 8 are here carried by a disk 27 of insulating material, fixed on the end of a shaft 28. Brushes 9 and 10, the latter not shown, are carried by an insulating disk 29 fixed on the end of a sleeve 30, revoluble on shaft 28. The brushes 7 and 8 on disk 27 clear the periphery of disk 29 and it is therefore apparent that disks 27 and 29 can be angularly adjusted relatively to each other within the range required. The driving-shaft 31, for example of a synchronous motor, is adjustably coupled to shaft 28 and sleeve 30 by a sleeve 32 sliding on the adjacent ends of the two shafts and sleeve. Sleeve 32 may be adjusted by a hand lever 33 pivoted at 33' and has three slots 34, 35, 36. Slot 34 is longitudinal and receives a lug 37 projecting from driving-shaft 31. Slot 35 is inclined in one direction and receives a lug 38 projecting from shaft 28. Slot 36 is inclined in the opposite direction and receives a lug 39 projecting from sleeve 30. Longitudinal movement of the sleeve 32 thereby causes rotation of shaft 28 and sleeve 30 in opposite directions and through equal arcs.

The apparatus described in the above-mentioned applications is effective for converting alternating current into direct when voltage control is desired, but is unsatisfactory for the reverse operation, since under these conditions the time-phase relation between the voltages of the converted current and the synchronous motor driving the brushes makes the speed-control difficult. In the practical operation of converters as illustrated in Figs. 1 and 2, satisfactory results depend upon maintaining the two equi-potential brushes at equal distances from the line of maximum direct-current potential. If these positions are not maintained, the two equi-potential brushes will cover portions of the commutator having unequal potential, with resulting heavy cross-currents in the transformer windings.

The converters illustrated in Figs. 5 and 6 avoid these difficulties. In each of these modifications, a closed secondary winding 40 having three-phase terminals 3, 4, 5 is arranged in inductive relation to two parallel primary windings 41, 42, from corresponding turns of which leads extend inward to the two circular sets of collector segments 43, 44. Two sets of four brushes each, rigidly spaced ninety degrees apart, are arranged to rotate in arcing proximity to the segments, one set of brushes 45, 46, 47, 48, in Fig. 5, carried for example by a shaft, transmitting current to the segments 43, and the other set 49, 50, 51, 52, of the same figure, carried by a sleeve journaled on the shaft, transmitting current to segments 44; while the set of brushes 45, 47, 50, 52, in Fig. 6, is carried by the shaft and the other set 46, 48, 49, 51, by the sleeve journaled on the shaft. Brushes 46, 50, 48, 52 are electrically connected to one slip ring receiving direct current from the negative brush-terminal, and the brushes 45, 49, 47, 51 are electrically connected to the other slip ring receiving direct current from the positive brush-terminal. The impressed direct current is thereby so transmitted to the primary windings 41, 42 as to produce four revolving magnetic poles, ninety degrees apart, in the two primary windings. With the revolving brushes in the position illustrated, the lines of maximum voltage are indicated by lines 53—54 and 55—56.

In operating the converter of Fig. 5 to change the voltage, brushes 45, 46, 47, 48 are shifted in one direction, and brushes 49, 50, 51, 52 are simultaneously shifted in the opposite direction through an equal arc. The direct currents flowing through the two sets of brushes thereby producing substantially sine-wave potentials in the primary windings, one set of brushes producing a sine wave which is out of phase with the sine wave produced by the current delivered by the other set of brushes and the difference in phase is in proportion to the distance of the two sets of brushes. The two waves are compounded, the peak of the voltage remaining at its normal fixed point of commutation, so that simple three-phase alternating current of potential dependent on the variable distances between the two sets of brushes and on the fixed ratio of the primary and secondary windings, is delivered to the leads 3, 4, 5. The lines 57—58, 59—60, 61—62, 63—64 indicate particular positions of the revolving brushes with reference to each other and to the lines of maximum direct current voltage. The circular arcs and arrows indicate the corresponding directions of current flow in the windings and the neutralizing action of the currents flowing in opposite directions in those sections of the windings subtended by two adjacent brushes of the same polarity. For instance, the section spanned by brushes 46 and 50 has currents flowing in opposite directions as shown at points 57 and 61, which, being of the same value, neutralize each other and prevent disturbances in the transformer windings.

In the converter shown in Fig. 6, the voltage change is made without reference to shifting phase-relations, by changing the distance between brushes of opposite polarity. Brushes 45, 50 and 47, 52 are shifted in one direction from the position of maximum voltage indicated by the lines 53—54 and 55—56, while brushes 48, 49 and 46, 51 are shifted in the opposite direction through an equal angle. Thus brushes 49, 50 and 51, 52, transmitting to the same segments 44, have the angles subtended by them changed in proportion to the voltage desired. Likewise brushes 45, 48 and 46, 47, are shifted through equal arcs in the opposite direction. The directions of the currents flowing in the windings are indicated by the arrows on the dotted circles, the currents flowing in opposite directions in those sections of the windings spanned by adjacent brushes, and thereby being mutually neutralized.

I claim:

1. The process of interconverting and adjusting the relative voltage of high-potential electric currents, which consists in causing alternating currents to traverse a winding, by simultaneously transmitting currents in parallel, by arcs, between successive portions of said winding and collectors, and adjusting the points of transmission equidistant from the peak of the potential-wave therein to give equal potential difference of conversions with respect to the maximum possible difference of potential conversion.

2. The process of interconverting and adjusting the relative voltage of high-potential electric currents, which consists in causing alternating currents to traverse a plurality of electrically parallel windings, by simultaneously transmitting currents in parallel, by arcs, between successive portions of said windings, and collectors, and adjusting the points of transmission equidistant from the peak of the potential-wave therein to give equal potential difference of conversions with respect to the maximum possible difference of potential conversion.

3. The process of interconverting and adjusting the relative voltage of high-potential polyphase and direct electric currents, which consists in causing polyphase currents to traverse a plurality of closed electrically parallel windings, by simultaneously and synchronously transmitting currents in parallel, by arcs, between successive portions of said windings, and collectors, and adjusting the points of transmission substantially equidistant from the peak of the potential-wave therein to give equal potential difference of conversions with respect to the maximum possible difference of potential conversion.

4. The process of interconverting and adjusting the relative voltage of high potential electric currents, which consists in simultaneously transmitting currents in parallel between collectors and successive portions of a plurality of windings, thereby causing alternating currents to traverse said windings, and adjusting the points of transmission at the collectors substantially equal distances in opposite directions from the peak of the potential wave in said windings to give equal potential difference of conversions with respect to the maximum possible difference of potential conversion.

5. The process of adjusting the relative voltages of interconverted direct and alternating currents, which consists in simultaneously transmitting currents in parallel to successive points in a winding or windings, and varying the position of the points of transmission thereto substantially equal distances in opposite directions from the peak of the potential wave in said windings to give equal potential difference of conversions with respect to the maximum possible difference of potential conversion.

6. The process of adjusting the voltage of interconverted high potential direct or alternating currents transmitted as arcs across gaps between a series of collectors and successive portions of a winding or windings, which consists in adjusting the points of transmission at the collectors substantially equal distances in opposite directions from the peak of the potential wave in said windings to give equal potential difference of conversions with respect to the maximum possible difference of potential conversion.

7. An apparatus for interconverting and adjusting the relative voltage of electric currents, comprising a winding, an alternating-current circuit in operative relation to said winding, a group of segments, spaced leads from said winding to said segments, a plurality of sets of brushes of different polarity spaced away from said segments, means for relatively rotating said segments and brushes, and means for simultaneously shifting the brushes of like polarity angularly in opposite directions.

8. An apparatus for interconverting and adjusting the relative voltage of high-potential electric currents, comprising a winding, a polyphase-current circuit in operative relation to said winding, a group of segments, spaced leads from said winding to said segments, a plurality of sets of brushes of different polarity spaced away from said segments, means for relatively rotating said segments and brushes, and means for simultaneously shifting the brushes of like polarity angularly in opposite directions.

9. An apparatus for interconverting and adjusting the relative voltage of high-potential polyphase and direct electric currents, comprising a winding, a polyphase-current circuit in operative relation to said winding, a group of segments, spaced leads from said winding to said segments, a plurality of sets of brushes of different polarity spaced away from said segments, means for relatively rotating said segments and brushes in synchronism with the currents in said winding, and means for simultaneously shifting the brushes of like polarity angularly in opposite directions.

In testimony whereof I affix my signature in presence of two witnesses.

CARL G. KOPPITZ.

Witnesses:
J. W. BLACKBURN,
B. M. GEE.